United States Patent [19]
Parkyn, Jr.

[11] Patent Number: 5,924,788
[45] Date of Patent: Jul. 20, 1999

[54] ILLUMINATING LENS DESIGNED BY EXTRINSIC DIFFERENTIAL GEOMETRY

[75] Inventor: William A. Parkyn, Jr., Hawthorne, Calif.

[73] Assignee: Teledyne Lighting and Display Products, Hawthorne, Calif.

[21] Appl. No.: 08/935,774

[22] Filed: Sep. 23, 1997

[51] Int. Cl.[6] ........................................................ F21V 5/04
[52] U.S. Cl. ........................... 362/329; 362/335; 362/311; 362/800; 362/249; 362/545
[58] Field of Search ...................................... 362/545, 249, 362/800, 311, 332, 335, 329, 328, 235, 240

[56] References Cited

U.S. PATENT DOCUMENTS

| | | |
|---|---|---|
| 2,647,202 | 7/1953 | Elmer . |
| 2,921,181 | 1/1960 | Elmer . |
| 3,210,536 | 10/1965 | Elmer . |
| 3,331,960 | 7/1967 | Elmer . |
| 3,390,262 | 6/1968 | Elmer . |
| 3,398,272 | 8/1968 | Elmer . |
| 3,423,584 | 1/1969 | Erickson . |
| 3,428,397 | 2/1969 | Elmer . |
| 3,471,231 | 10/1969 | Elmer . |
| 3,494,693 | 2/1970 | Elmer . |
| 3,526,459 | 9/1970 | Elmer . |
| 4,698,730 | 10/1987 | Sakai et al. ........................ 362/800 |
| 4,868,719 | 9/1989 | Kouchi et al. ........................ 362/800 |
| 4,941,072 | 7/1990 | Yasumoto et al. ................... 362/800 |
| 4,975,814 | 12/1990 | Schairer ................................ 362/800 |
| 5,140,220 | 8/1992 | Hasegawa ............................ 362/800 |
| 5,704,709 | 1/1998 | Zwick et al. ........................ 362/800 |

Primary Examiner—Thomas M. Sember
Attorney, Agent, or Firm—William W. Haefliger

[57] ABSTRACT

An illumination system with a prescribed output pattern comprising a light source and an optical lens redirecting the light of the source into an output beam, the lens with multiple surfaces at least one of which has a shape that is not a surface of revolution, the shape generated by the following method: on the Gaussian sphere of directions of the output beam exiting the surface of the lens, in accordance with the prescribed output pattern, establish a first grid of equal-flux zones of solid angle; on a portion of the Gaussian sphere of directions of the light emitted from the source into the interior of the lens, establish a second grid with the same number of equal-flux zones of solid angles as the first grid, with a coordinate-system topology congruent with that of the first grid, such that the zones of the second grid are in one-to-one correspondence with the zones of the first grid, with the flux of each zone in proportion to its corresponding zone of the first grid, according to the local transmittance of the lens, with either of both of the grids being rotationally non-symmetric; by this correspondence define a flux-redistributing directional mapping function from the first Gaussian sphere to the second Gaussian sphere, whereby any light ray from the source can be assigned a direction in the output beam, according to the zone of the second grid into which the ray falls, so that the redirected ray falls in the corresponding zone of the first grid; establish one or more lens surfaces to redirect the source rays to the output rays, using the vector laws of refraction or reflection to derive a distribution of normal vectors for each surface; from the distributions of normal vectors, successively generate each lens surface, beginning with that nearest source and going outwards.

40 Claims, 11 Drawing Sheets

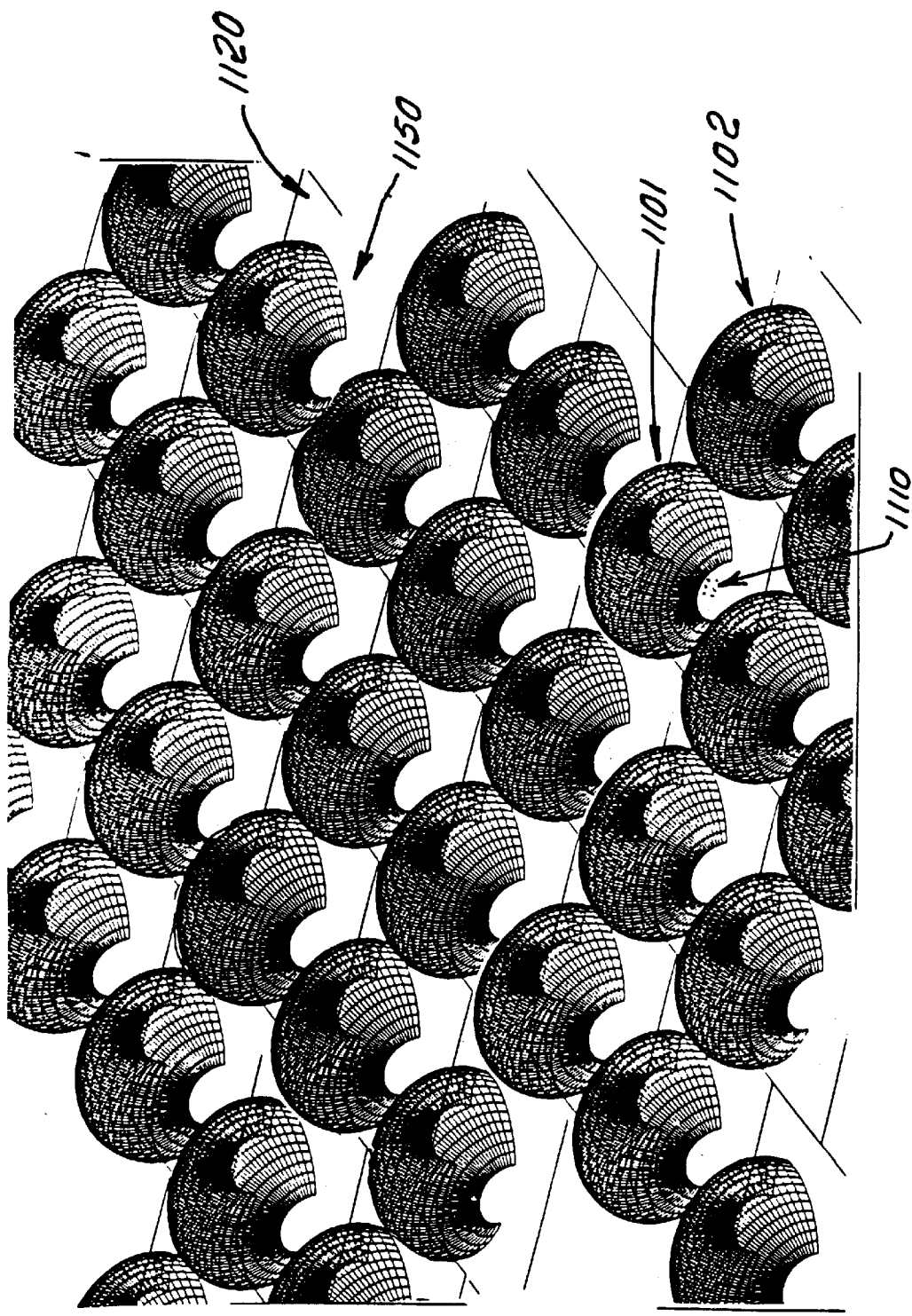

ILLUMINATING LENS DESIGNED BY EXTRINSIC DIFFERENTIAL GEOMETRY

BACKGROUND OF THE INVENTION

Almost all of the prior art of lens design can be subsumed under the imaging category, the purpose of which is an accurate rendering of the appearance of an object. Lenses have seen little use in the illumination field, where reflectors have predominated because of their lower cost and superior efficiency when used with conventional light sources. Thus, there has been little emphasis on the design of lenses for illumination, where the purpose is the fulfillment of a prescribed pattern of light distribution, and imaging of the light source is undesirable. Many of these prescriptions are for rectangular and other non-circular light patterns.

Because optical lenses have overwhelmingly been formed by grinding and polishing, their surfaces are figures of revolution, such as spheres, tori, and cylinders. In general, figures of revolution are not suitable for forming illumination patterns that are not circularly symmetric.

The present invention embodies a different method of lens design than that of optical imaging lenses. It utilizes shapes that are not figures of revolution, but which can be manufactured by molding of plastic or glass. They are especially suitable for use with light-emitting diodes, the tiny sizes of which allow such lenses to be small and easier to injection mold.

The most important lighting prescriptions addressed by the present invention are for vehicular lamps, by the Society of Automotive Engineers, and for ships, by the United States Coast Guard. Particular embodiments of the present invention address these prescriptions. These are far-field prescriptions for an angular distribution of light, whereas illumination prescriptions are for some nearby surface, such as the walls or ceiling of a room.

The current art of luminaire design utilizes the method of computerized searching through a number of design variations, with ray tracing used to evaluate the closeness of a candidate luminaire's output to the desired light distribution. This technique is not completely satisfactory because the vastness of the design space precludes an exact match of luminaire output to prescribed output, given that the design starting point is only a guess.

An example of traditional design is the lenslet array utilized in automotive signal lamps. Numerous small lens elements, usually spherical, cylindrical, or toric, transform the collimated beam from a reflector into a wide-angle beam shaped to fulfill government standards. Such combinations of reflector and lenslet arrays, however, typically have poor values of efficiency, such as one third. Although the reflector can be blamed for much of this inefficiency, also at fault is the restriction of lenslet shapes to spheres, cylinders, and torics (formed by rotating cutting elements), which greatly limits the designer's ability to match the shape of the output beam to the prescribed pattern. Such a match maximizes efficiency, since every point of the specification can be met with a minimum amount of light.

The general design of rotationally symmetric luminaires uses the method of matching the cumulative distribution of source intensity with that of the desired output. Cumulative intensity runs from 0 to 100%, starting at the optical axis and going outwards to the edge of the desired output pattern. Another cumulative distribution is calculated for the intensity of the light source, over the angular range to be redirected by the luminaire. Then, any angle of a ray from the source, having a particular percentage of cumulative source intensity, is redirected into an output angle having the same percentage of cumulative output intensity. From these two angles is calculated the angle the luminaire surface must have to perform the redirection. Then the actual luminaire surface is derived by radial integration outwards from an initial starting point. The resultant shape has the slope necessary to redirect the light from a rotationally symmetric source into a prescribed rotationally symmetric output pattern.

This method of matching cumulative distributions is not suitable, however, for cases where either the source intensity distribution or the desired output pattern are not figures of revolution, that is, azimuthally constant. (An example of such a source is a light-emitting diode with two bonding pads.) This is because a cumulative distribution is inherently one-dimensional, while the two dimensions of angle space prevent a unique line integral from being used to calculate a meaningful index of the shape of the distribution.

In optical lens design, the conceptually closest design method is that of anamorphic lenses. These, however, are designed for a prescribed distortion pattern, a quite different matter than fulfilling a prescribed variation in luminous intensity.

SUMMARY OF THE INVENTION

The present invention concerns a general class of illumination lenses that can accurately match a source with a particular desired output, when either or both of these are not figures of revolution. No trial and error processes are required for their design. The mathematical discipline of differential geometry is the basis for the generation of the shapes of particular lenses. As with the above-mentioned method of rotational symmetry, there are two basic stages in the design process:

(1) deriving a distribution of surface slope by matching source and output intensity patterns;

(2) generating the luminaire shape by integrating the surface slope.

At each stage, however, surface theory requires completely different design methods than those of the one-dimensional case of rotational symmetry. When surfaces are studied as curved two-dimensional spaces, intrinsic differential geometry is involved, regarding properties unaffected by folding, but altered by stretching.

In the case of the present invention, however, the lens surface operates in our everyday three-dimensional space, so that extrinsic differential geometry is used to design it. For example, a polyhedron, such as a cube, has a three-dimensional shape studied by extrinsic differential geometry; but, it also has such intrinsic properties as those revealed by drawing triangles on it that enclose a corner. These triangles will violate the laws of plane trigonometry (i.e., their interior angles do not add to 180°), so that this surface's cubic nature is an intrinsic aspect, independent of it being in three-dimensional space.

The particular use of extrinsic differential geometry for the present invention is in surface synthesis, whereby the lens surface is integrated from the specification of its tilt at a large number of points. The surface tilt is calculated according to the laws of optics from knowledge of how the light from a source must be redirected in order to fulfill a particular prescription. When either the source light or the prescription has an intensity distribution that is not rotationally symmetric, design methods of the prior art are deficient, as discussed above. The present invention utilizes computer calculations to numerically specify a lens surface given the intensity distributions of the source and the desired output.

When dealing with an intensity distribution that is not rotationally symmetric, the arena of expressing this distribution is the surface of a sphere of unit radius, known mathematically as the Gaussian sphere. measured in steradians, with 4 π being the solid angle of the entire Gaussian sphere. One steradian is a circle 65.5° across, or a square 59.3° on a side, in either case a total of $(180/)^2=$ 3282.8 square degrees. Luminous intensity is simply the amount of lumens emitted into a solid angle, with a candela=1 lumen per steradian (this has replaced the old term "candlepower", which could mean either intensity or a measuring unit of intensity). An intensity pattern can be graphically presented with either a two-dimensional map of contours of constant intensity or a three-dimensional map with height representing intensity.

Central to the design method of the present invention, and an object of the invention, is a third method of displaying an intensity function: a grid, or mesh, on the Gaussian sphere, with cells of varying size. The cell size are inversely proportional to intensity, so that each cell has the same amount of luminous flux. The particular grid pattern chosen is called a tessellation, or tiling, or the sphere. An example is the latitude and longitude grid of geography, and another is the triangulation based on the icosahedron. In the case of the present invention, however, the entire sphere need not be tiled, since ordinarily neither light sources nor illumination prescriptions cover all directions. Therefore, there is more freedom to adopt tilings, for particular designs, that would form what are mathematically known as incomplete atlases.

It is a major object of the present invention to provide an illumination system with a prescribed output pattern, and which comprises a light source and an optical lens that redirects source light into an output beam, the lens having a shape that is not a surface of revolution.

It is another object of the invention to provide a lens, the surface of which is not a surface of revolution, and wherein the lens surface possesses surface normal vectors enabling the lens to transform source light into an object beam fulfilling the prescribed output pattern.

A further object is to provide a lens, as referred to, and having overall size relative to the size of the light source, and obtained by selection of the distance from an initial starting point of lens surface generated from the light source, that keeps blurring of the output beam below a level defined by the angular resolution of the object pattern prescription.

Yet another object concerns a lens shape generation method that includes the steps:

a) on the Gaussian sphere of directions of the output beam exiting the surface of the lens, in accordance with the prescribed output pattern, establish a first grid of equal-flux zones of equal solid angle;

b) on a portion of the Gaussian sphere of directions of the light emitted from the source into the interior of the lens, establish a grid with the same number of zones of equal-flux solid angles as the first grid, and with a coordinate system topology congruent with that of the first grid, such that the zones of the second grid are in one-to-one topological correspondence with the zones of the first grid, with the flux of each second grid zone in proportion to the flux of its corresponding zone of the first grid, according to the local transmittance of the lens, with either or both of the grids being rotationally non-symmetric;

c) by use of the correspondence, define a flux-redistributing directional mapping function from the first Gaussian sphere to the second Gaussian sphere, whereby any light ray from the source is assigned a direction in the output beam, according to the zone of the second grid into which the ray falls, and so that the redirected ray also falls in the corresponding zone of the first grid;

d) by the vector form of Snell's law of refraction, express the correspondence by establishing on the second grid an overlaying distribution of surface normal vectors;

e) from an initial starting point, mathematically generate the surface coordinates of the lens by contact-integrating the distribution of the surface normal vectors, along an initial strip that follows a principal curvature of the surface, and then, by successive contact-integrations, orthogonally outwards from the initial geodesic strip, of the grid surface normals, generate adjacent characteristic strips that follow the other principal curvature of the lens surface, outward to the boundary of the second grid.

The method also may include the step of performing successive integrations of adjacent characteristic strips in such a way as to fulfill the integrability condition dictating equality of the crossed second derivatives of the surface of the lens, thereby to ensure that the surface of the lens possesses the surface normals necessary for it to transform the light from the source into an output beam substantially fulfilling the prescription.

These and other objects and advantages of the invention, as well as the details of an illustrative embodiment, will be more fully understood from the following specification and drawings, in which:

DRAWING DESCRIPTION

FIG. 10 is a perspective view of a lens unit array;

FIG. 14 is a plan view of a vessel carrying light sources as will be referred to.

DETAILED DESCRIPTION

Figure 1:
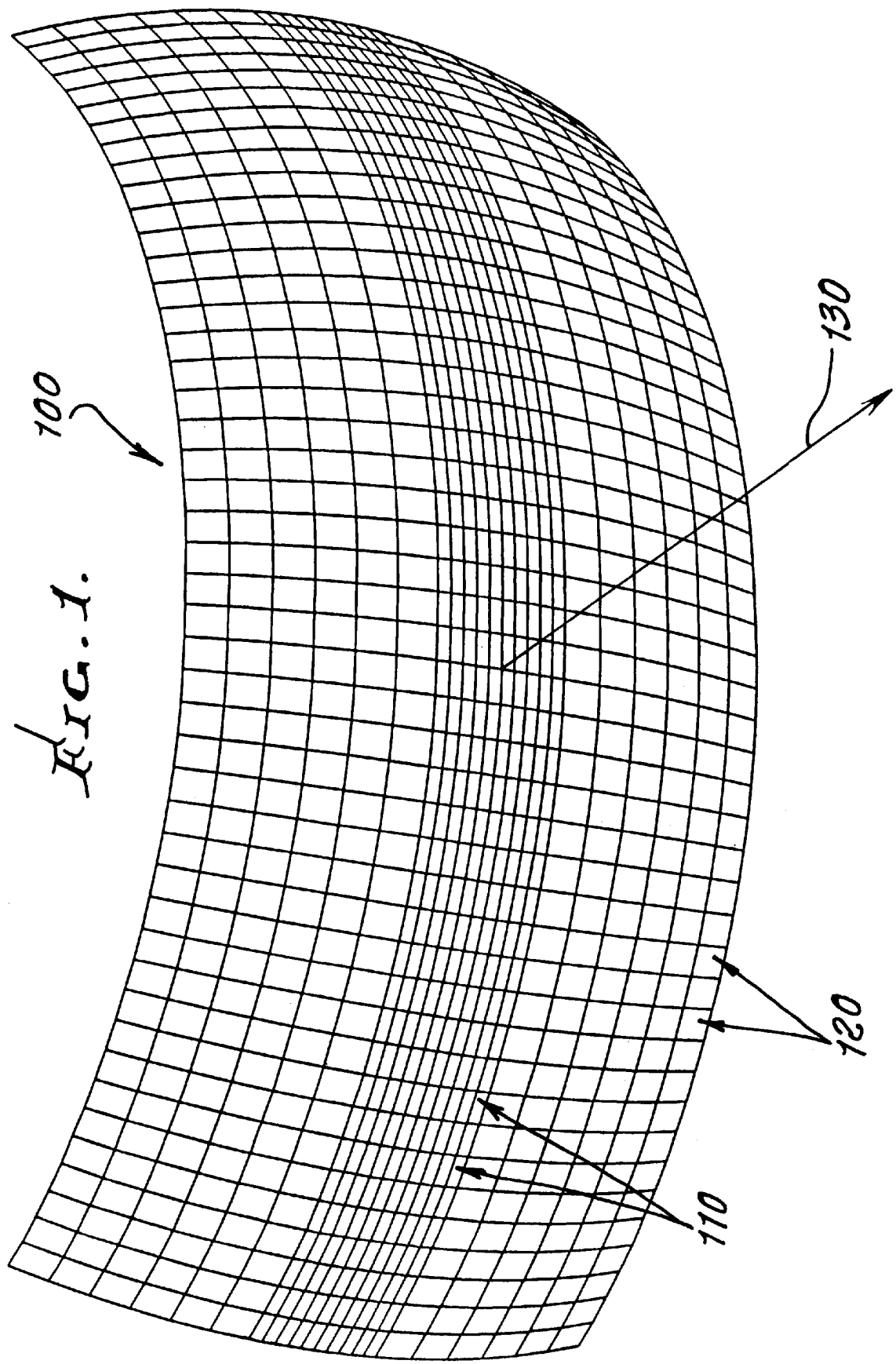
FIG. 1 depicts a grid on the Gaussian sphere of prescribed intensity output.

There are several methods for constructing a grid, as referred to, for a particular specification. A regular tessellation, where all cells are the same size, can be warped to fit the prescription. With a large number of cells, such a warping can accurately match the prescription.

This warping is accomplished by a coordinate shrinkage of the regular grid. A typical prescription has a center or a nearby direction of greatest intensity $I_{MAX}$. Align a rectangular grid (i.e., an equatorial sector of a latitude-longitude grid) on that center, so that it is located on the corner of a cell, at the direction $(x_0,y_0)$. Use an iteration interval dx that is much smaller than the cell width $w_x$ of the grid, e.g., $dx=w_x/1000$. Then iterate the following summation to find the distance $x_1$ to the other corner of the warped cell:

$$x_1 = \sum_{i=0}^{1000} dx / I(x, y_0)$$

This shrinks the cell in the x direction to compensate for the intensity as it varies with x. In the orthogonal is direction y, along a grid line at $x_i$, the same method is used:

$$y_1 = \sum_{i=0}^{1000} d y / I(x_i, y_0) / I(x_i, y)$$

Here there is an expansion of the cell as the intensity decreases relative to its value on the $y_0$ line. By this method, the grid remains orthogonal, with a different warping pattern in the two directions, but the total warping is a product of the x and y warpings. This condition is known as separability.

Sometimes the convenience of such separability is not possible, as when the prescription has a large ratio $I(x_i,y_0)/I(x_i,y_t)$, from grid center to grid top $y_t$, at x and a much smaller one at grid edge $x_e$. This will cause a much larger number of cells to be generated at $x_e$ than at $x_0$. Instead, the x warping is redone at each $y_i$, so that the grid is not orthogonal and the grid lines are curved.

Alternatively, a polar grid can be used, that is, the polar section of a latitude-longitude grid, with the pole at the source maximum. Then the warping can be by making the latitude circles into ovals or by making the longitude lines at uneven intervals, or both, so that an orthogonal grid would result. Alternatively, a non-orthogonal grid could be constructed by bending the longitude lines.

Alternatively, a regular tessellation with a very large number of cells can be condensed by grouping these small cells into larger ones of varying size, so that each group of cells has the same total luminous flux. In either case, the grid cells are indexed to express position within the grid, with either a single number or a pair of numbers, analogous to latitude and longitude in geography.

The key to the design method of the present invention is the construction of two such grids: the first (see FIG. 1) on the Gaussian sphere of output intensity and the second (see FIG. 2) on the Gaussian sphere of source intensity. These spheres have no physical location but exist abstractly, with the purpose of establishing the two grids. The source grid can be thought of having a miniaturized version of the source at its center. The prescription grid can be thought of having a miniaturized version of the present invention at its center. Both express the far-field behavior of light.

Both grids have the same number of cells and the same indexing pattern, so that a one-to-one correspondence is established between them. This correspondence requires that both grids have the same topology, so that if one is triangular, for example, the other cannot be rectangular, or polar. Another grid topology is elliptical-parabolic. Thus, the warping method of grid generation would be preferable, since it could better accommodate the differences between the source and output distributions of intensity. The output grid is constructed first because the fulfillment of the prescription is the purpose of the lens, and typically, the prescription will have more irregularities or idiosyncrasies than the source output.

FIG. 1 depicts one typical grid 100 on the Gaussian sphere of directions, extending horizontally for a span of 112.5° and vertically 25° above and below the horizontal plane. In the vertical span of 5° above and below the horizontal plane, cells 110 are half the size of remaining cells 120. This grid expresses the U.S. Coast Guard specification for navigation lights, that full intensity be maintained within 5° of the horizontal and half intensity to within 25° of the horizontal. Thus, each cell contains the same amount of light flux. For the sake of clarity of illustration, there are only 22 horizontal rows of 46 cells in this pattern, although in actual practice there would be many times more. The grid is centered on axis 130.

Figure 2:
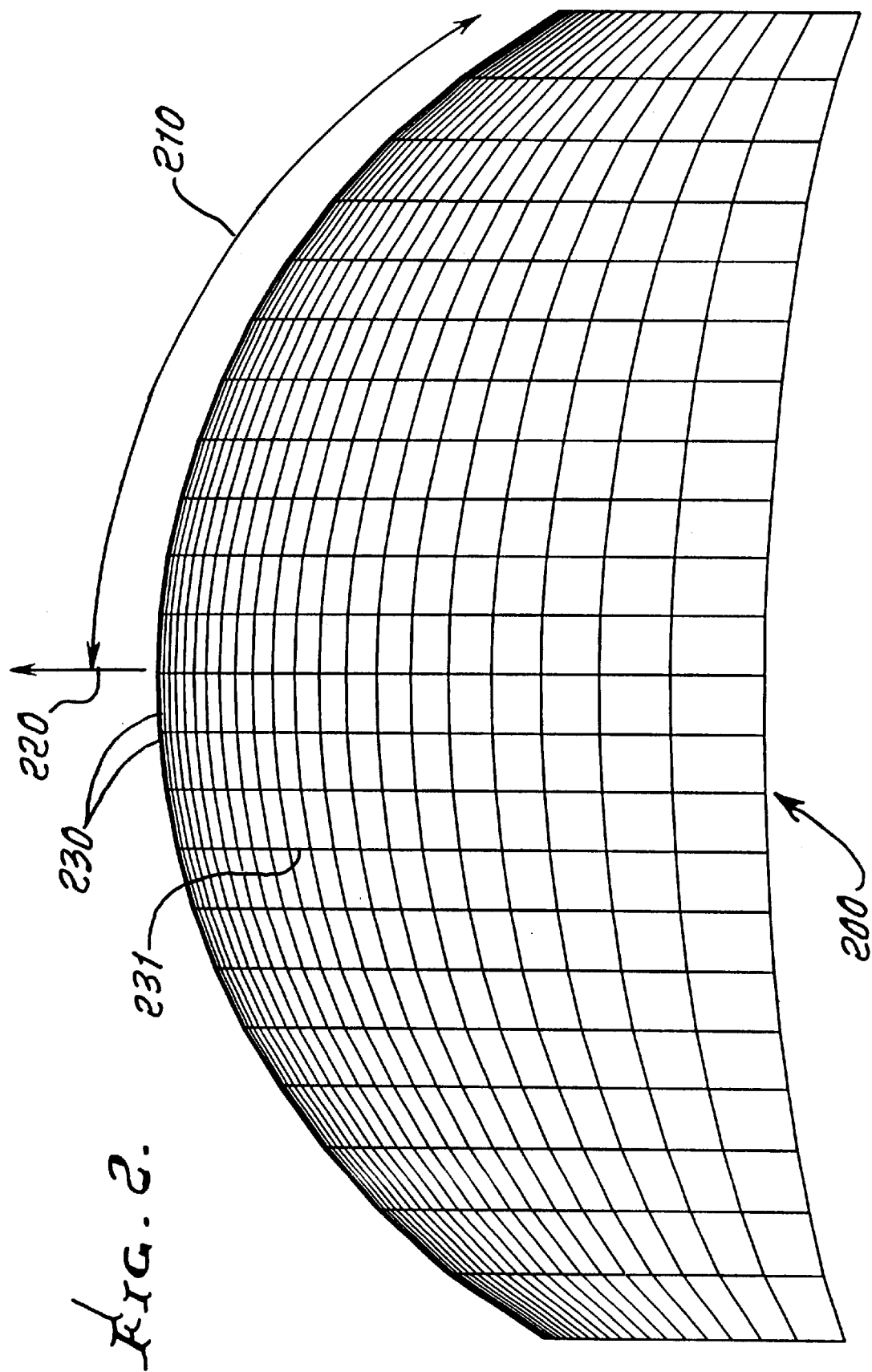
FIG. 2 depicts a side view of a corresponding grid on the Gaussian sphere of light-source intensity.
Figure 3:
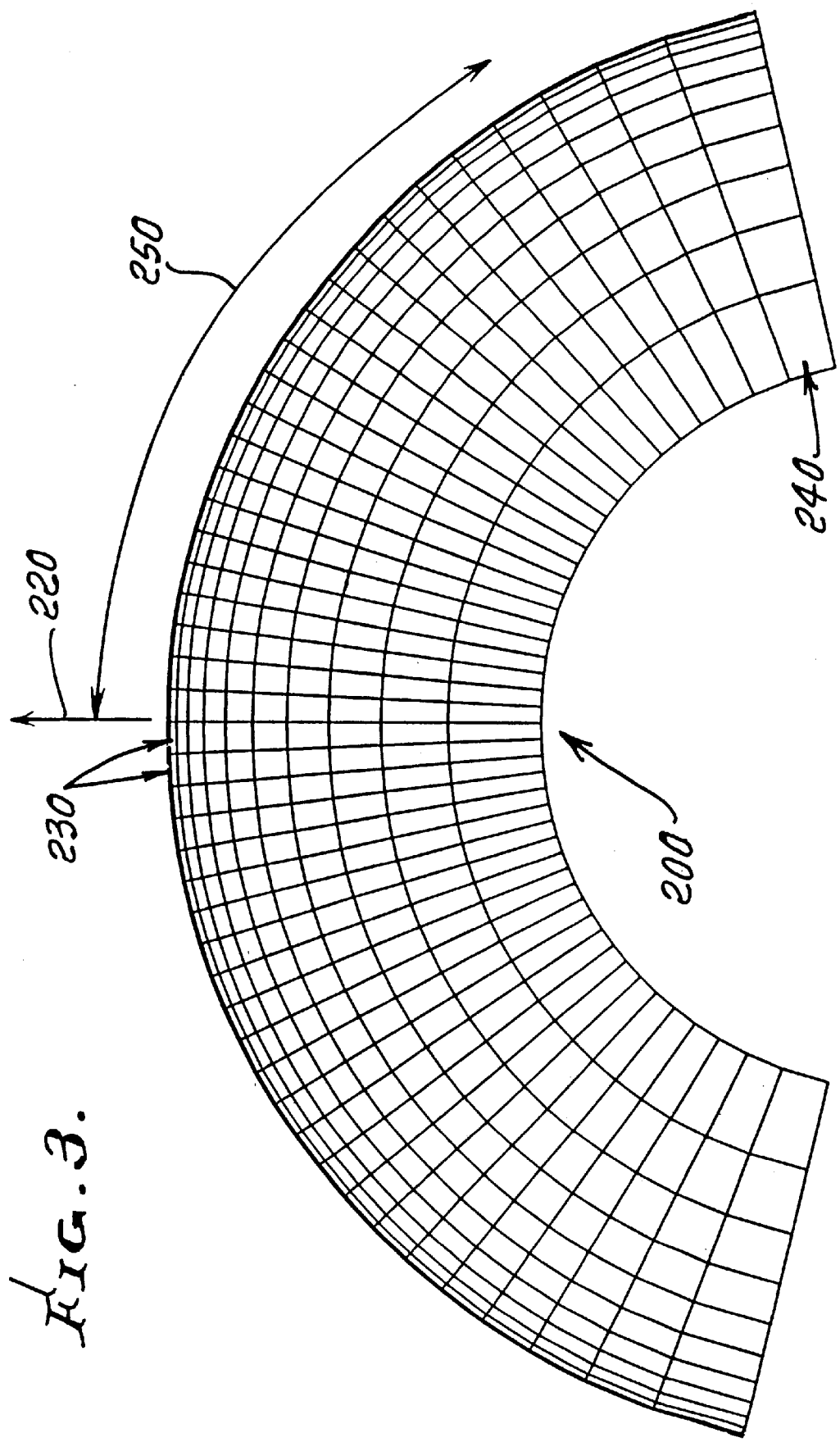
FIG. 3 depicts a top view of the FIG. 2 grid.

FIG. 2 depicts a side view and FIG. 3 a top view of corresponding light source grid 200, also with 22 rows of 46 cells. This grid is on the Gaussian sphere of directions of light coming from a Lambertian source, which has intensity that falls off with the cosine of angle 210 with axis 220. Cells 230 nearest axis 220 are the smallest, while those further away are larger, with corner cell 240 the largest. Horizontal angle 250 is analogous to longitude, and vertical angle 210 to latitude.

Figure 4:
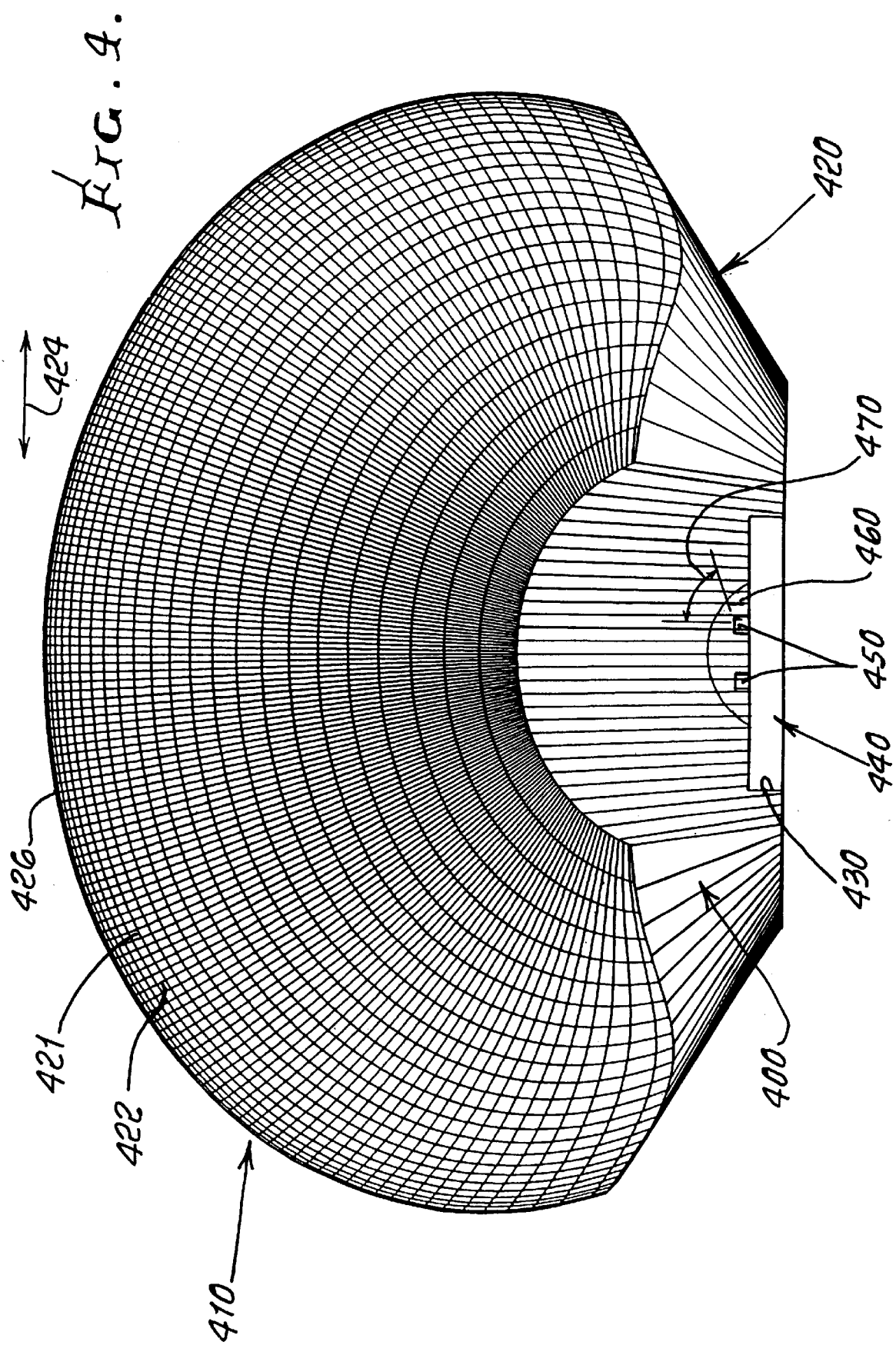
FIG. 4 depicts a top view of a lens derived from these grids.

FIG. 4 depicts a top view of a lens 400, a particular embodiment of the invention, generated from the correspondence between the grids of FIG. 1 and FIG. 2. The optically active top surface 410 is mathematically generated from the surface normals derived from the corresponding grids 100 and 200. Below the top surface is conical support base 420. At the bottom of the lens is an indentation or recess 430 to receive a circuit board 440, upon which are mounted two rows of light-emitting diodes 450, embedded in a protective, transparent, epoxy mass 460. Lens 400 is in optical contact with transparent mass 460, so that there is no air gap. This lens will efficiently transform the Lambertian output, represented by grid 200, of absorbing-substrate LEDs 450 into radiation conforming to the Coast Guard Standard, represented by grid 100. This view shows how maximum horizontal source angle 470 is 77°, within which is emitted 95% of the output of a Lambertian source. This illustrates how the weak fringes of a source's output may not be worth collecting.

In FIG. 4, the generated, curved, surface lines 421 correspond to generated, curved, grid lines 230 in FIG. 3; and generated, curved, grid lines 422 in FIG. 4 (orthogonal to lines 421) correspond to generated, curved, grid lines 231 in FIG. 2.

Vertical lines 423 in FIG. 4 represent a side view of the tilted side of 420. The FIG. 4, FIG. 5 lens is generally dome-shaped and has overall length $L_1$ in the directions indicated by arrows 424 in FIG. 4 that is greater than its overall width $W_1$ in the direction indicated by arrows 427 in FIG. 5 normal to 424 and normal to the page of FIG. 4. The lens is upwardly convex along its different lengthwise surface indicated at 426, and upwardly convex along its uppermost widthwise surface 428.

Figure 5:
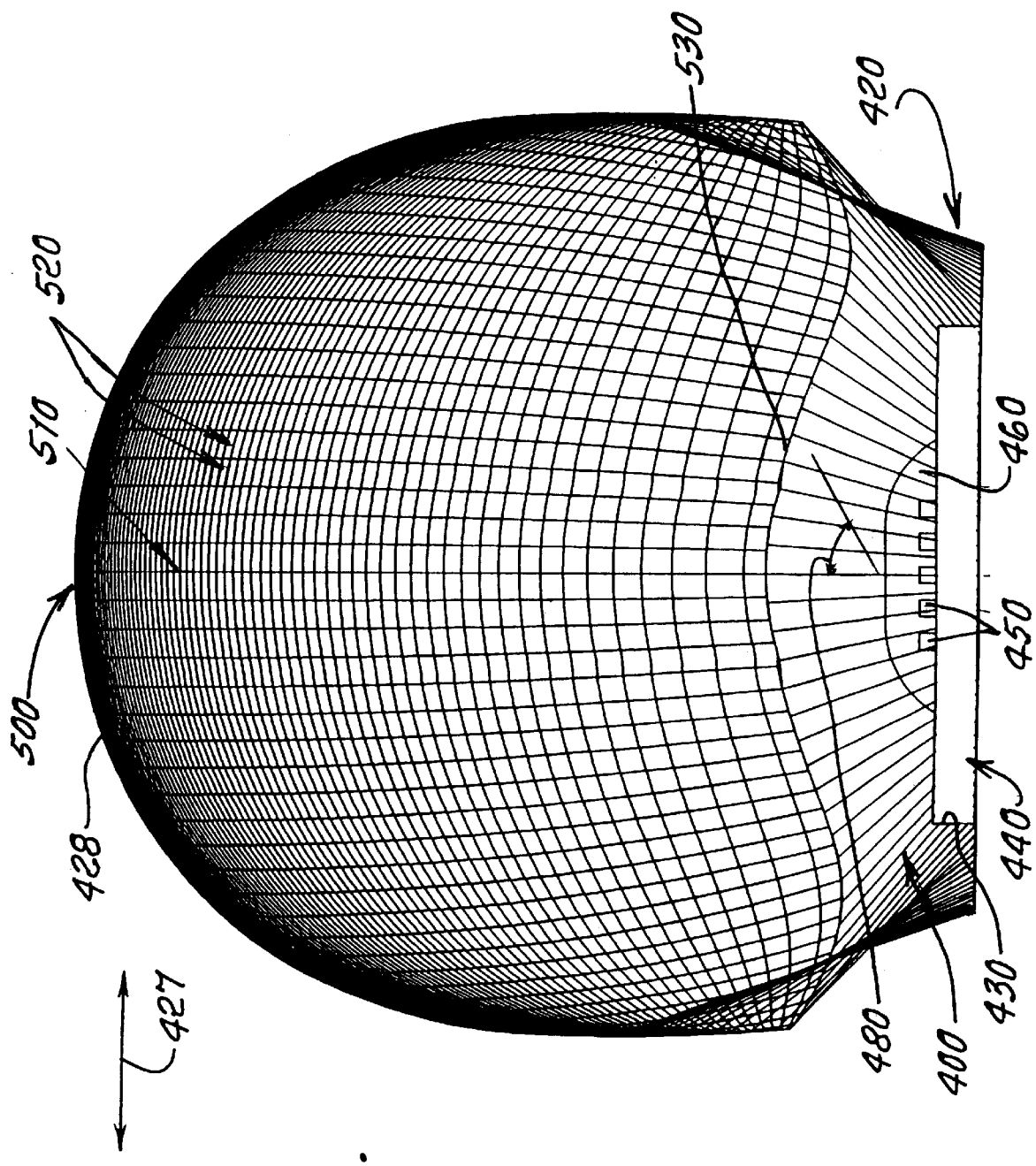
FIG. 5 depicts a side view of the lens.

FIG. 5 depicts a side view of the lens 400, with light-emitting diodes 450. Maximum vertical angle 480 is 60°, the maximum that can be refracted into the 25° limit of the grid 100. The overall height of a working model of lens 400 is only about half an inch, far smaller than equivalent light output incandescent lamps of the prior art. Initial point 500 at the lens crest is the starting point for striating lens surface 410. Initial strip 510 extends horizontally from 500. Characteristic strips 520 extend orthogonally from 510. The boundary is located at 530.

Usually, the geometry of the source grid is sufficiently different from that of the output grid that there will be "leftover" source light outside the source grid. In this case, the source grid can be overloaded so that some of the output grids will have more light than that prescribed. Thus, the overall light utilization can be maximized, and the extra light will result in the prescribed intensity being exceeded. In many cases, the prescription is only for a minimum intensity, so this would be permissible.

This correspondence, between the source grid and the output grid, specifies the redirection function that the lens must perform in order to transform the light from the source into the desired output beam. The grid cells must be sufficiently small so that the intensity is nearly constant within a cell. They also must be sufficiently numerous that the redirection function changes slowly from cell to adjacent cell. This enables a smooth construction of the lens surface.

Figure 6:
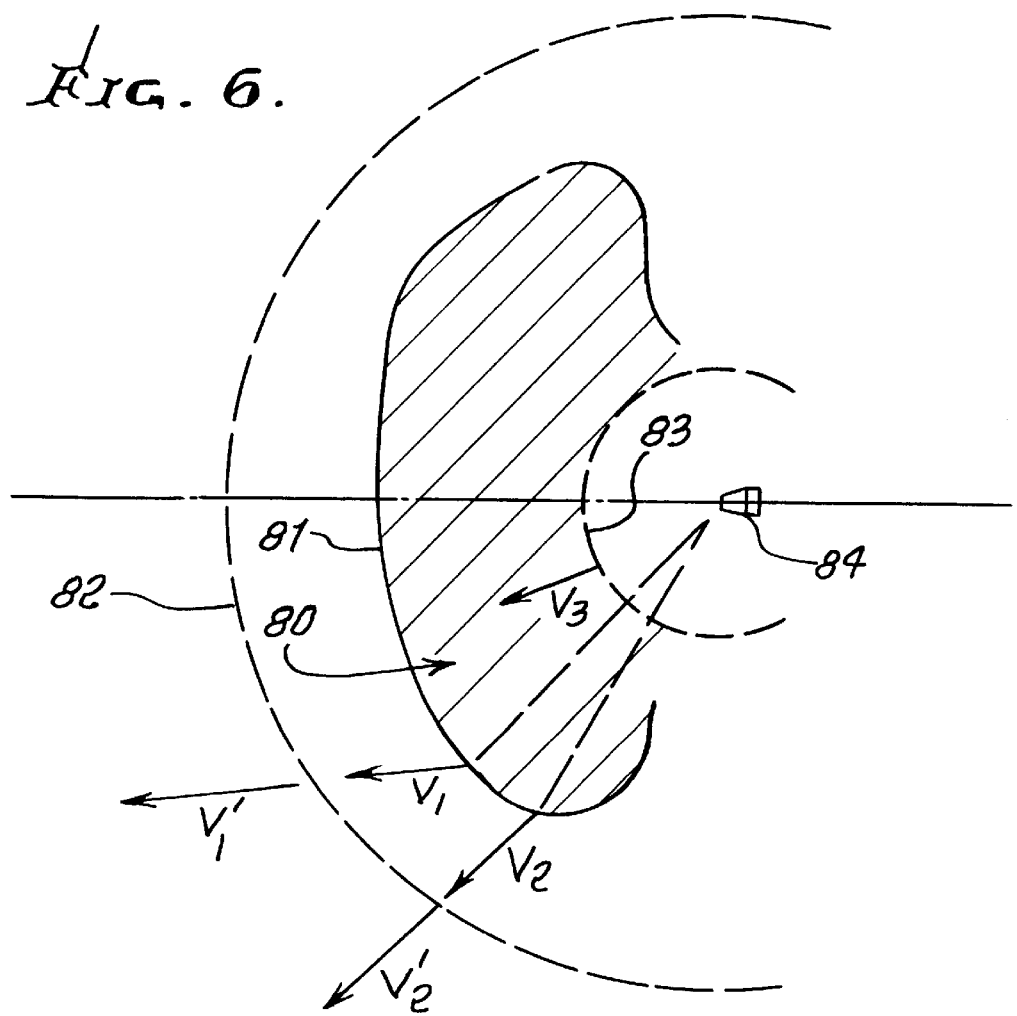
FIG. 6 is a schematic diagram of grids and a generated lens, and light outputs.

FIG. 6 shows a lens 80 in cross sectional elevation, and which has been constructed in the manner described. The lens surface is shown at 81. The first grid 82 is shown as a section through the expanded Gaussian sphere of directions of the light output beam exiting from the surface 81 of the lens. See for example beam vector $V_1$ exiting the lens surface, and corresponding to desired beam vector $V_1^1$ exiting the surface of the grid 82; and beam vector $V_2$ exiting the lens surface, and corresponding to the desired beam vector $V_2^1$ exiting the surface of the grid.

The second grid 83 is shown as a section through the reduced Gaussian sphere of direction of light output from the LED source at 84. See light output vector $V_3$.

For each pair of corresponding cells on the two grids, there is a deflection of source ray to output ray that must be carried out by the lens. This deflection can be produced by refraction, reflection by a thin-film metal coating, total internal reflection, or a combination of these, if the deflection is carried out in stages. Large deflection angles may require such staging, as in the case of a wide-angle source and a narrow output beam.

For redirection being done by a single refraction, the analysis is as follows. Snell's law of refraction, at the boundary between two isotropic media of refractive indices n and n', is expressed by the equation n sin i=n' sin i' for incidence angles i and i', in the plane of incidence. Rays of light are represented by three-dimensional, unit-length vectors pointing in the direction of propagation. The boundary surface between the two media is represented by a unit-length vector perpendicular to it, the surface normal vector. For incident ray I and surface normal vector N, the refracted ray R can be calculated from the vector form of Snell's law, via the sine vector S and the cosine vector C:

$$S = (n'/n)[I - N(N \cdot I)]$$

$$C = N\sqrt{(1 - |S|^2)/|N \cdot I|}$$

$$R = C + S$$

These equations are for the derivation of the refracted vector R when vectors I and N are known. In designing the lens of the present invention, the vector I is given by position on the source grid, while the vector R is given by the corresponding position on the output grid. The surface normal vector N must be derived for each cell in the source grid. This is done differently according to whether n>n' (ray going out of material) or n<n' (going in). In both cases, a vector M is first calculated, and then unitized to give the surface normal vector:

$$N=M/|M|$$

In the first case, n>n' (going out of material), the vector M is given by:

$$M=I+[n'/(n-n')](I-R)$$

In the case of n<n' (going into material), the vector M is given by:

$$M=R+[n/(n'-n)](R-I)$$

For reflection, either by a metal film or totally internally, the surface normal that will reflect incoming ray I into reflected ray Q is given by utilizing $$M=Q-I$$

In one embodiment of the invention shown in FIGS. 4 and 5, the source is in optical contact with the lens, so that the surface normal values N(i,j) are determined by the case of n>n'.

Figure 7:
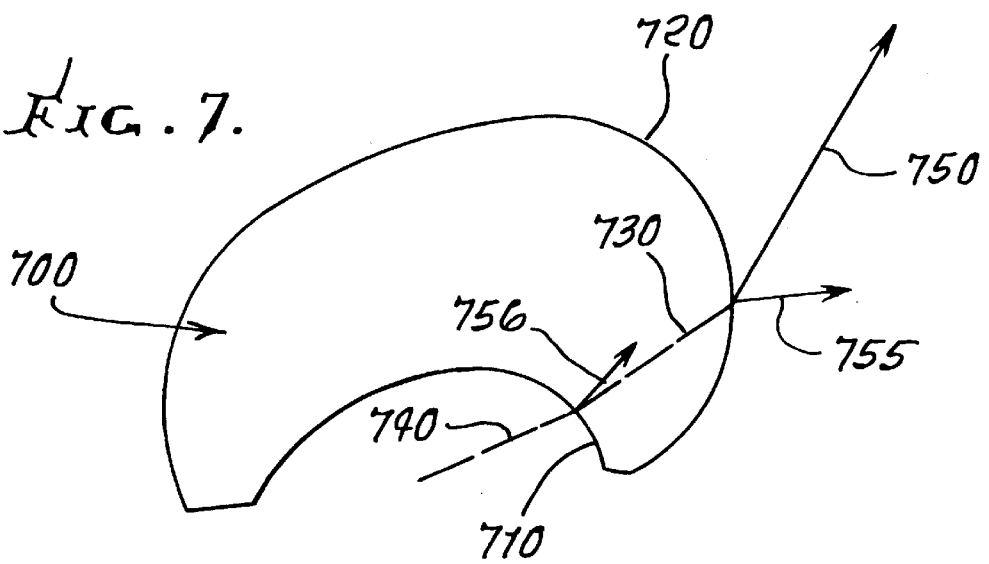
FIG. 7 is a cross section through a lens generated in accordance with the invention.

FIG. 7 shows another embodiment in which the lens 700 has an entry surface 710 as well as an exit surface 720, so that there is an intermediate ray 730 inside the lens with vector T(i,j), in the plane defined by incident ray 740 with vector I and exiting ray 750 with vector R and somewhere between them. To minimize aberrations that distort the effects of finite source size, T is chosen so that the two surface normals, entry $N_1$ (755) and exit $N_2$ (756), have the same angles with rays I and R. This can be done numerically with a root-bisection procedure. When the deflection angle between I and R is more than 35°, a refractive index in the 1.5 range, typical of injection-moldable plastic, requires two surfaces, and the minimum-aberration choice of ray T is required. When the biggest angle between the first and second grids is less than 35°, the entry surface may be hemispheric, with no net deflection of light. This would be the case for incandescent lamps, with envelopes having elevated temperatures that require an air gap to intervene between the lamp and the lens.

The Coast Guard standard for masthead lamps for an anchored ship has a 360-degree pattern, calling for an incandescent lamp with a vertical filament. Generally, such filaments come with a vertical supporting post that casts a shadow. The current invention can take a teardrop shape to in effect get light around this shadow.

Figure 8:
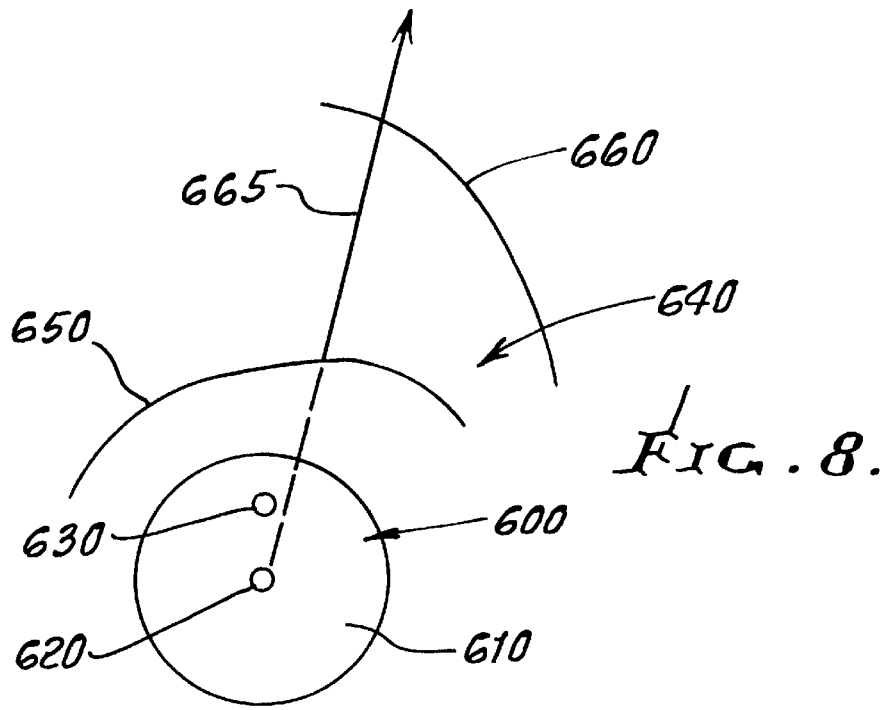
FIG. 8 is a top plan view of a lens generated in accordance with the invention.

FIG. 8 shows an overhead view with lamp 600, having transparent envelope 810, vertical oriented cylindrical filament 620, and vertical support post 830. Lens 640 has inner surface 650 and teardrop exterior 660. Ray 665 that just clears post 630 is refracted into its shadow, so the 360-degree prescription is fulfilled.

More generally, incandescent lamps usually transmit light into a pattern much bigger than a hemisphere, typically the entire sphere minus a small portion blocked by the filament support means or envelope sealing means. If the prescribed illumination pattern is relatively narrow (e.g., Society of Automotive Engineers taillight standard with 40° pattern width), even refraction by two surfaces would be insufficient to redirect a 300° wide lamp output into such a narrow pattern. In this case, part of the lens would utilize total internal reflection (TIR) as well as refraction by an entry and an exit surface. There are two design strategies, according to whether the TIR portion of the lens redirects light to the outer portion of the output grid or has an output grid of its own with a central portion that is additive to the output grid of the all-refractive portion of the lens. In effect, the second strategy amounts to having two independent sub-lenses acting in parallel to additively fulfill the illumination prescription.

Figure 9:
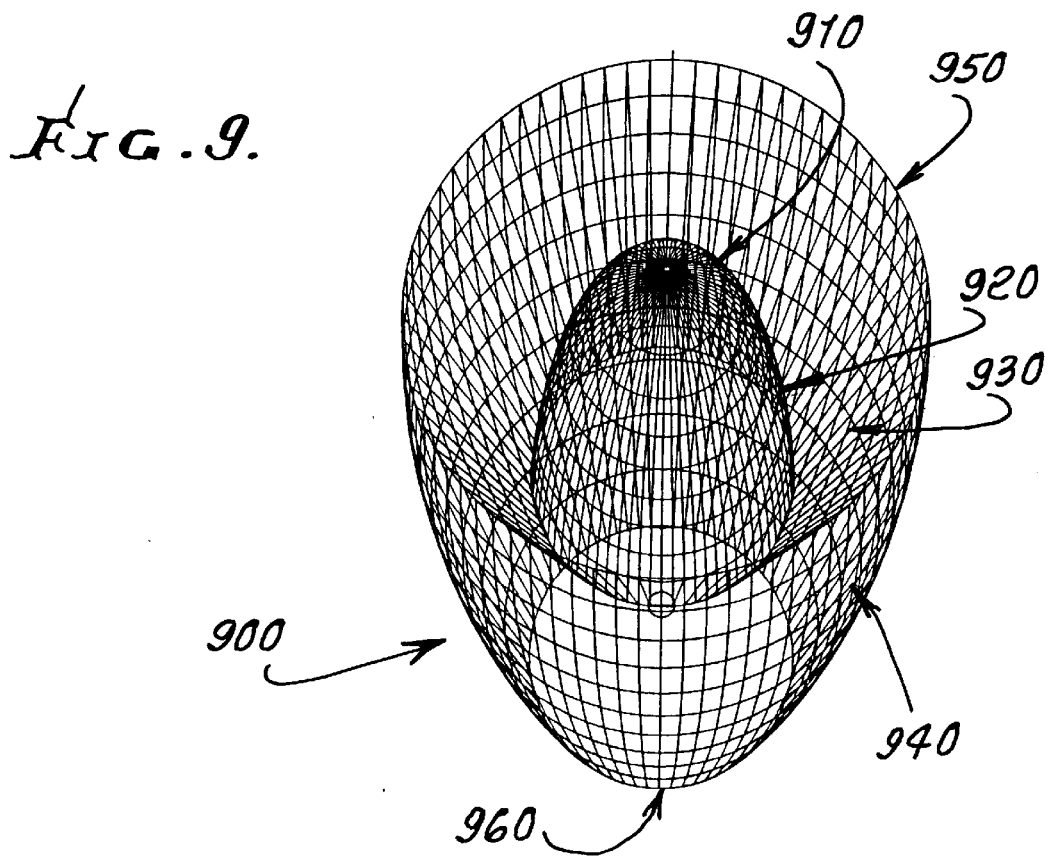
FIG. 9 is a perspective view of a lens unit generated in accordance with the invention, and a reflector.

The reflecting surface requires its own exit surface, which must not block significant amounts of light from the source. Therefore, the exit surface should take the form of a conicoid with its apex at the light source. A conicoid is a warped cone, a developable surface consisting of lines radiating from its apex. The outer part of the first output grid must be refracted through this conicoid to become a transformed grid that is the prescription for the reflecting surface. In FIG. 9, lens 900 has central body 910 that is similar to the lens of FIG. 4 & FIG. 5, with light source 920. Surrounding it and extending from its periphery is conicoid surface 930 with its apex at source 920. Reflecting surface 940 extends downward from conicoid 930.

The light-emitting diode (LED), in contrast, typically emits light into only a hemisphere, because of being mounted on larger objects, such as circuit boards. Also, its low operating temperature allows it to be in optical contact with a plastic lens, in the case of a relatively wide illumination prescription, such as the Coast Guard navigation lights. For the narrower-angle automotive lights, an entry surface may be necessary to redirect the light from the edge of the second grid to the edge of the first grid.

The object of the present invention is to construct one or more lens surfaces. The first surface encountered by light from the source is given by $$r(i,j)=r(i,j)I(i,j)$$

where r is the distance from the source to the lens surface, in the direction of ray vector I. A second surface would be specified by $$r_2(i,j)=r_1(i,j)+r_{12}(i,j)T(i,j)$$

where $r_{12}$ is the distance from the first surface, along refracted vector T. If the second surface is reflecting, then there would be a third surface, specified by $$r_3(i,j)=r_2(i,j)+r_{23}(i,j)Q(i,j)$$

where $r_{23}$ is the distance from the second surface, along reflected vector Q.

Each lens surface must be shaped so that each ray vector encountering it is properly redirected: I into R (single surface) or I into T and T into R, or T into Q and Q into R. Each redirection happens when a ray encounters the proper surface normal vector N. Surfaces can be expressed in a coordinate system having its origin at the light source, with the z axis aligned with the output beam, so that a point (x,y,z) on the surface is specified by the function z(x,y), having derivatives $p=(\partial z/\partial x)$ and $q=(\partial z/\partial y)$. Then the surface normal is given by $N=(-pi-qj+k)/\sqrt{(1+p^2+q^2)}$, where i, j, and k are the Cartesian unit vectors defining the x, y, and z coordinate axes, respectively.

In seeking to calculate a lens surface from knowledge of its surface normals, expressed as an array N(i,j), a numerical iteration will be required, beginning with an initial point and moving outwards. This iteration should neither move away from a correct solution or converge to an incorrect solution.

Unlike many problems of surface generation, that of the present invention is greatly helped by the knowledge that each surface point z(i,j) must lie on a ray vector, such as I(i,j) in the case of a single-surface lens. Thus, a trial point can be moved along this ray until the best point is found for a fit of the desired surface normal to the adjacent surface points and to their surface normals. A fundamental property of surfaces in space is smoothness, expressed by the equality of crossed second derivatives:

$$\partial^2 z/\partial x\partial y=\partial^2 z/\partial y\partial x$$

It can also be expressed as an integrability constraint $$\partial p/\partial y=\partial q/\partial x$$

This constraint can be utilized to check the fit of the generated surface to the array of surface normals.

Surface curvature is measured by how fast the normal vector rotates, due to motion tangent to the surface. Except for a very few surfaces, such as spheres that have constant curvature, the surface curvature at a point varies with the tangent direction, according to a function known as the shape operator. The maximum and minimum values of the surface curvature define the principal curvatures, primary and secondary respectively. They lie in directions perpendicular from each other. The two orthogonal tangent vectors aligned to the principal curvatures, along with the surface normal vector, define the principal frame field. This is a triad of vectors that is defined for every surface point. Also known as the Darboux frame, it is very convenient for surface generation.

Accordingly, the generation of the lens surface would typically begin at some initial point, r(0,0), and proceed outwards, generating an initial strip of surface (using the terminology of partial differential equations). The most accurate integration is obtained when the outward direction is chosen to coincide with the primary principal curvature (for example as seen in FIG. 4), so that successive changes of the normal vectors align with the initial strip. Along this principal curvature, the integration is one-dimensional and hence easier to perform. Another initial strip would be generated along the secondary principal curvature (for example as seen in FIG. 5). Then the surface is completed by successively generating characteristic strips parallel to the primary initial strip, beginning on successive sites on the secondary initial strip.

Numerical accuracy is critical to a successful lens design, so that the derived surface has everywhere the proper surface normal vector. The method of initial and characteristic strips enables the use of the principal frame field, rather than the triple vector cross product. The latter method is abstractly suitable for keeping a characteristic strip parallel to a prior strip. For actual computation, however, the small angles between successive grid points causes the triple vector product, with its squaring of these small angles, to have extreme sensitivity to machine precision (i.e., the number of decimal points utilized by the particular computer). This sensitivity typically results in large surface generation errors and a failure of the generation process.

The use of principal curvatures to align the initial strip highlights an important factor in choosing the output and source grids: they should be aligned so that their axes correspond to the maximum and minimum amounts of redirection of the source light into the output light. Then the array N(i,j) of surface normals will be prealigned with the principal curvatures of the lens surface. The placement of the grids in the source and output light distributions should typically be either the maxima or the centroids of said distributions, which would respectively be the ray vectors I(0,0) and R(0,0). The primary and secondary initial strips would be formed by integrations from initial point r(0,0) through r(1,0), r(2,0), etc., and from r(0,0) through r(0,1), r(0,2), etc., respectively. The first characteristic strip would begin at r(0,1) through r(1,1), r(1,2), etc., and at each point r(i,j)=r(i,j) I(i,j), the value of r(i,j) is a function of prior values r(i,j−1), preceding it on the characteristic strip, and r(i−1,j) on the adjacent prior strip.

Once each strip has been generated, the prior strip, if it is not an initial strip, can be checked point-by-point for fit to both sides, and adjusted according to the integrability constraints. Then, the characteristic strip could be regenerated from this new prior strip. This is known as a relaxation method.

For implementations of the present invention with multiple surfaces, the surfaces are generated with the innermost surface first, and outwards in succession. The initial points for successive surfaces would be chosen so that the iteration does not collide with a prior surface. This may require several trials. In the case of FIG. 9, the initial strip of reflecting surface 940 can be either upper rim 950 or lower rim 960.

Finally, when a lens design is completed and checked for performance, it may need to be adjusted if its transmittance is anywhere significantly reduced by large angles of refraction. For example, at refractive index 1.5, the largest useable incidence angle from air into the material is 75°, where the transmittance is 75%, rather than the 96% of normal incidence. This is equivalent to a reduction in source intensity. The source grid would have its cells enlarged to accommodate this effect, and the lens would be recalculated with the modified grid. Similar adjustments can be made for scattering from surface roughness or from metal-film reflectivity of less than unity.

Accordingly, the invention contemplates an illumination system with a prescribed output pattern comprising a light source and an optical lens redirecting the light of the source into an output beam, the lens with multiple surfaces, at least one of which has a shape that is not a surface of revolution, the shape generated by the following method:

a) on the Gaussian sphere of directions of the output beam exiting the surface of the lens, in accordance with the prescribed output pattern, establish a first grid of equal-flux zones of solid angle;

b) on a portion of the Gaussian sphere of directions of the light emitted from the source into the interior of the lens, establish a second grid with the same number of equal-flux zones of solid angles as the first grid, with a coordinate-system topology congruent with that of the first grid, such that the zones of the second grid are in one-to-one correspondence with the zones of the first grid, with the flux of each zone in proportion to its corresponding zone of the first grid, according to the local transmittance of the lens, with either of both of the grids being rotationally non-symmetric;

c) by the correspondence define a flux-redistributing directional mapping function from the first Gaussian sphere to the second Gaussian sphere, whereby any light ray from the source can be assigned a direction in the output beam, according to the zone of the second grid into which the ray falls, so that the redirected ray falls in the corresponding zone of the first grid;

d) establish one or more lens surfaces to redirect the source rays to the output rays, using the vector laws of refraction or reflection to derive a distribution of normal vectors for each surface; and e) from the distributions of normal vectors, successively generate each lens surface, beginning with that nearest source and progressing outwards.

Further, the lens surfaces are generated from the distributions of normal vectors by the following method:

f) from an initial starting point, calculate the surface coordinates of each surface of the lens by contact-integrating the distribution of surface normal vectors, along an initial strip that follows one principal curvature of the surface and then, by successive contact-integrations, orthogonally outwards from the initial strip, of the grid of surface normals, generate adjacent characteristic geodesic strips outward to the boundary of the second grid;

g) to ensure that the surface of the lens possesses the surface normals necessary for it to transform the light from the source into an output beam substantially fulfilling the prescription, perform the successive integrations of adjacent characteristic geodesic strips so as to fulfill the integrability condition dictating equality of the crossed second derivatives of the surface of the lens;

h) and determine the overall size of the lens relative to the size of the light source by selecting the distance of the initial point from the source to keep the blurring of the output beam below a level defined by the angular resolution of the prescription.

In addition, the source is typically provided to be in optical contact with the lens, and the redirection is from within the lens material outwards into the environment, by refraction, with the distribution of surface normals determined by the vector form of Snell's law of refraction.

In this regard, the lens is provided to have an entry surface admitting light from the source into its interior and an exit surface for light leaving the interior; and the entry surface performs negligible redirection, and substantially the entirety of the redirection is performed by the external surface. The entry surface redirects the source light, so that a new system of interior rays is used to generate the surface normal distributions of both of the surfaces, with redirection allocated between the entry and exit surface normals.

Typically, a reflecting surface may be provided, and wherein large redirection angles are implemented with the reflecting surface. Also, the reflecting surface typically utilizes total internal reflection, which is preferable to thin film metal coating. The coating would only be necessary when the incidence angle is less than the critical angle arcsin (1/n) for refractive index n.

An important application of the present invention is in large-scale video displays utilizing groups of individually controlled, light-emitting diodes: red, green, blue, and possibly yellow. Each group would have its own lens, similar to that of FIGS. 4 & 5, but possibly somewhat smaller. A full video display, as for a sports stadium, would have 525 rows of 800 lenses, each with a group of LEDs. As shown in FIG. 10, adjacent lenses 1101 and 1102 lie vertically staggered so that they do not obstruct each other's horizontally directed output. Lens 1101 is positioned over array 1110 of six LEDs: 2 red, 2 green, 1 blue, and 1 yellow. The lens has a horizontal swath of 120° and a vertical swath of 30°. An advantage over the prior art of large-scale television is that the curved surfaces of the lens disperse reflections from glare sources such as the sun. In addition, back surface 1120 would have a low reflectance means, such as a black matte coating.

Figure 12:
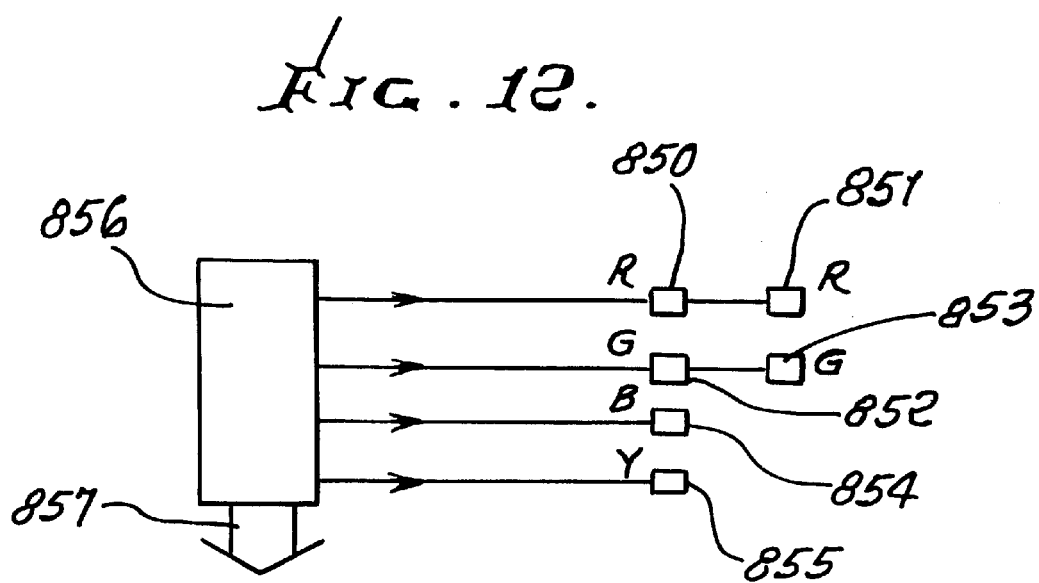
FIG. 12 is a circuit diagram to control LEDs at each of the lens units in the FIG. 10 array.

FIG. 12 shows multiple LEDs at 850–855, controlled as at their luminous intensities, as by a master control 856. They have different wavelengths, as for example two red-emitting LEDs 850 and 851, two green-emitting LEDs, as at 852 and 853, one blue-emitting LED 854, and one yellow-emitting LED 855. Each of the lenses in FIG. 10 typically has a light source consisting of the FIG. 12 LED cluster; and the LEDs are controlled, as to provide a viewable colored picture, changing with time. Bus 857 represents control signal path to other LEDs in the array.

Figure 11:
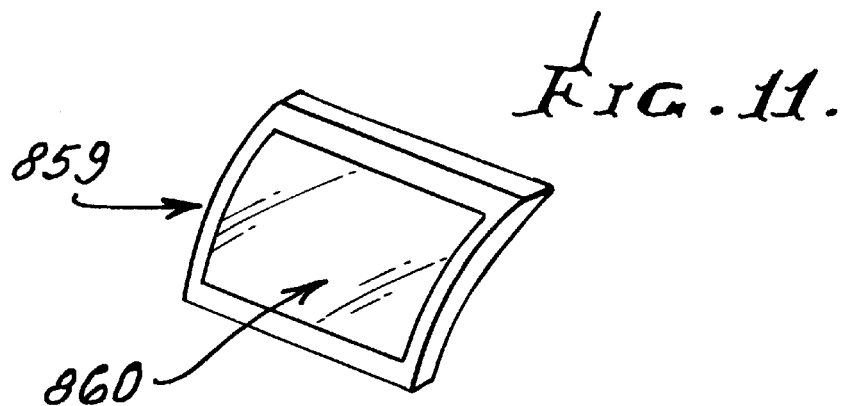
FIG. 11 is a video or television unit having a screen incorporating the FIG. 10 lens unit array.

In FIG. 10, the multiple lenses or units indicated at 1150 are in an array, as shown (arranged in rows and columns), and may comprise a video screen for display of television or computer imagery, so that each of the lenses comprises a pixel of the display. See FIG. 11 showing a video unit, same as a flat TV set 859 having a viewable screen 860 made up of the lens array or raster of FIG. 10.

Figure 13:
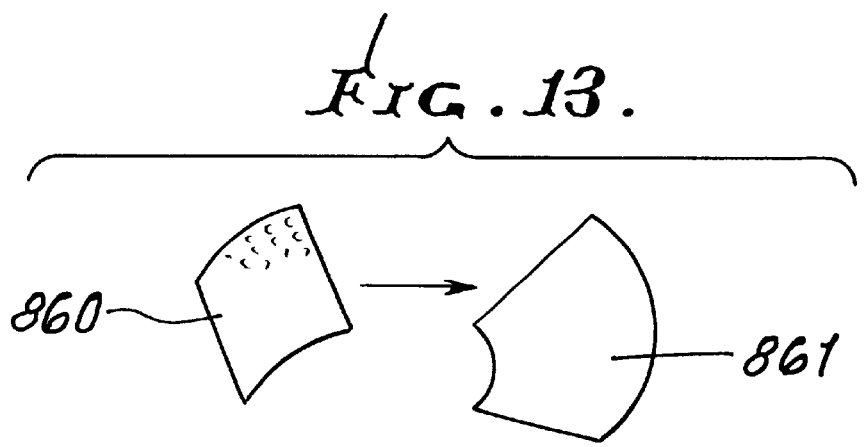
FIG. 13 is a diagrammatic view of an audience viewing zone or area in relation to a large video screen incorporating the FIG. 10 array; and showing relative angling of lens units or cells.

FIG. 13 shows the lens array 860 like that of FIG. 10, for example, which is shallowly curved to be effectively aimed at a specific audience location indicated at 861. Lenses at opposite ends of the screen are differentially angled to provide light outputs subtending the audience zone. The lenses in the array in FIG. 10 are mounted as on a surface 1120 of low reflectance, to provide the effective "screen".

Figure 14:
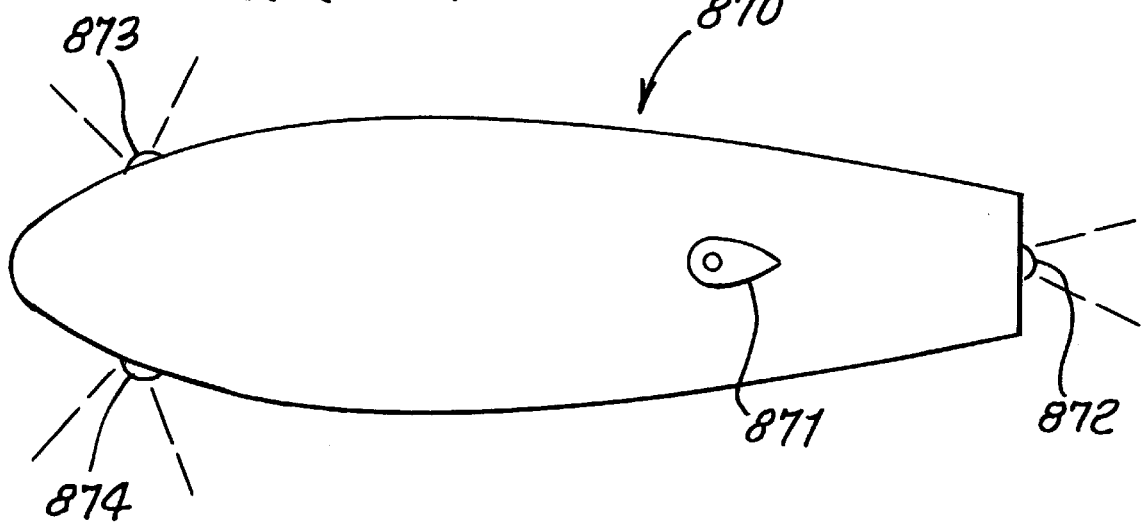

FIG. 14 shows a vessel 870 in plan view, incorporating lens units as described. The light sources shown may include incandescent lamps, at the LED locations described above, with a white light prescription for lenses. Lens 871 is a Coast Guard 360-degree masthead navigation light, as seen in FIG. 8; and the lens has a horizontal cross section with a teardrop shape that eliminates shadowing of the filament of the lamp by support posts of the filament. The lamps 872 may have a substantially cylindrical filament in a vertical orientation. The prescription is the Coast Guard 135-degree stern navigation light; and the lens utilizes a reflective surface to redirect a portion of the output of the lamp into the prescribed output.

Bow lenses are indicated at 873 for red starboard, and 874, each with the 112° side marker prescription.

Figure 9A:
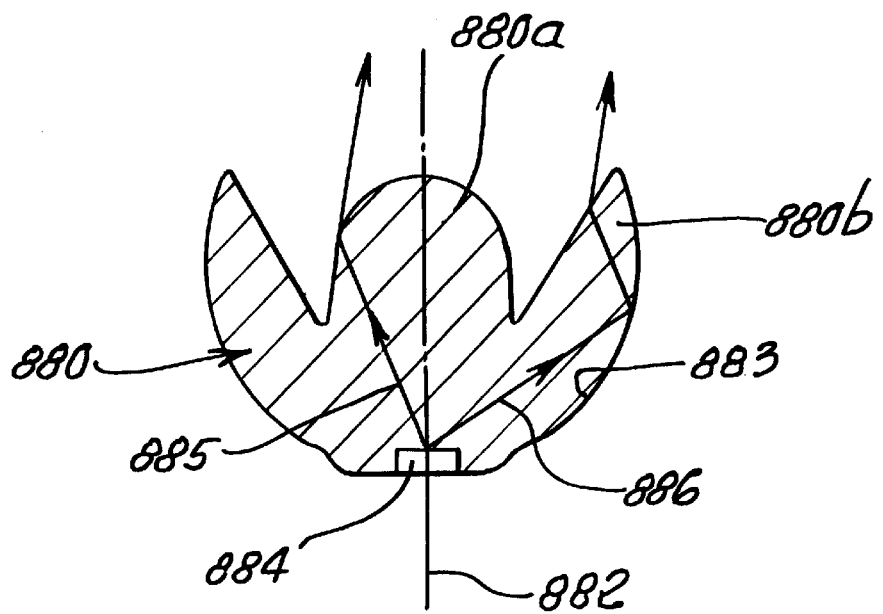
FIG. 9a is a section taken through the FIG. 9 lens and reflector.

FIG. 9a shows a luminaire, in accordance with the invention, and characterized by the following:

a) a lens body 880 having a forwardly dome-shaped inner portion 880a, and an outer portion 880b extending about and spaced from the inner portion, the portions being light-transmitting and integral;

b) the inner portion extending non-circularly about a forwardly extending axis 882;

c) there being a reflector 883 on the outer portion, whereby a light source at 884 in rearward alignment with the inner portion provides certain light rays 885 that travel forwardly and are refracted by the dome-shaped inner portion to travel forwardly from the inner portion, and other light rays 886 that travel in the outer portion and are reflected by the reflector to travel forwardly in the outer portion and forwardly from the outer portion.

The FIG. 9a luminaire may have the configuration of the FIG. 9 lens unit.

The reflecting surface of reflector 883 is typically generated by the method that includes:

a) partitioning the first grid into an inner refraction-only portion and an outer reflection-assisted zone, according to the maximum practical redirection angle of the refractive index of the material of the lens, and effect a corresponding partition of the third grid of light interior to the lens, b) surrounding the exterior surface of the central refraction-only portion of the lens, establish an outer conicoid portion of the exterior surface of the lens, the conicoid tilted so as to minimize the impingement upon it of rays coming directly from the source, c) via backwards ray tracing of refraction through the tilted surface, transform the outer portion of the first grid into a grid upon the Gaussian sphere of directions of light interior to the lens, d) establish a one-to-one correspondence between the partial grid of backwards-ray-traced light interior to the lens and the outer portion of the third grid, e) by the vector form of the law of reflection, express the correspondence by establishing on the outer portion of the third grid an overlaying distribution of surface normal vectors, f) utilizing the outer perimeter of the tilted exterior surface as an initial strip, mathematically generate the surface coordinates of the reflective surface by the method of contact integration of orthogonal characteristic strips, g) and extending the conical surface sufficiently far so that the characteristic strips will not impinge upon the light source or the inner lens surface.

The lens is further characterized as having a) TIR surface, b) mirror surface.

Figure 15:
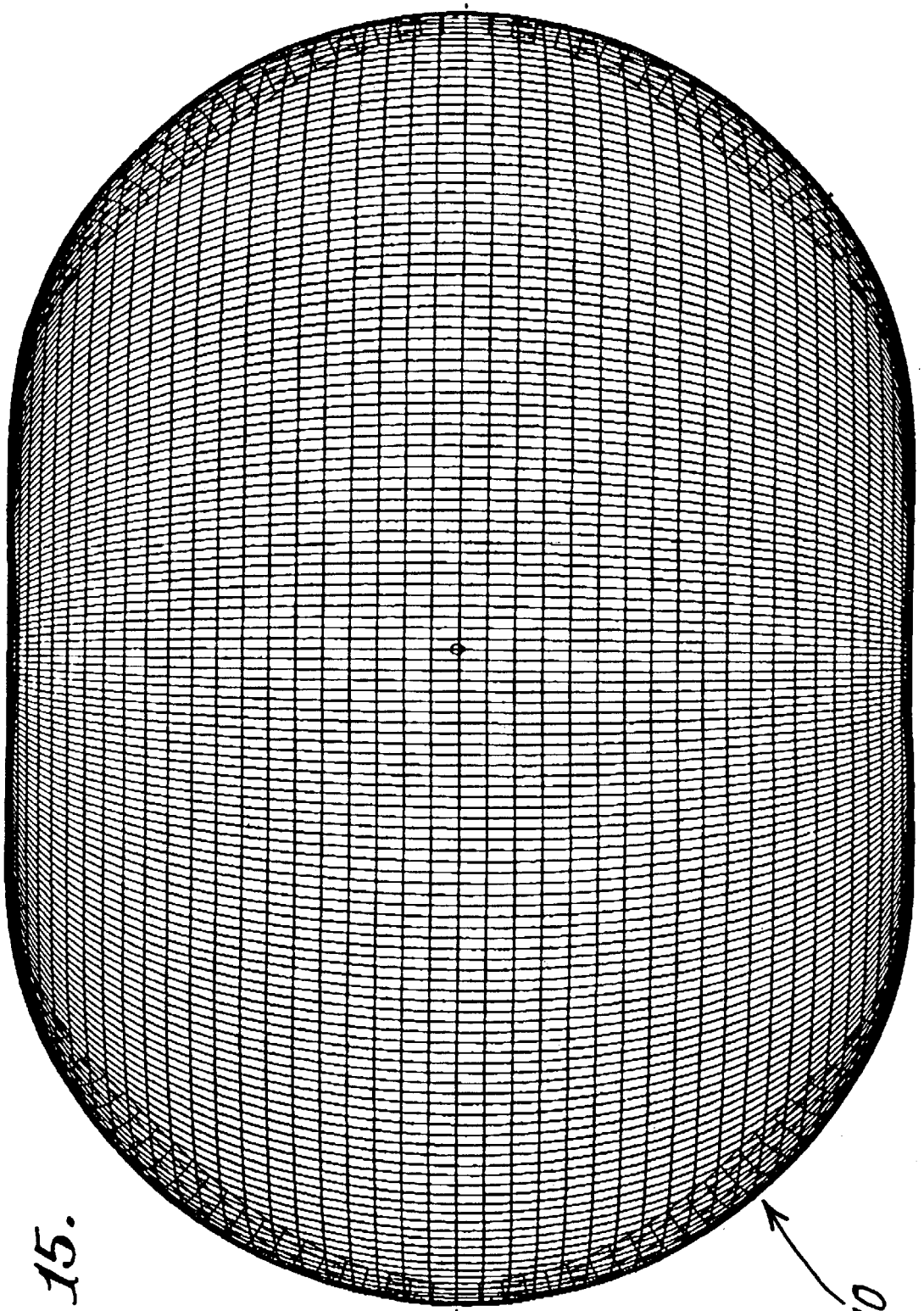
FIG. 15 is a top plan view of the FIG. 4 lens.

FIG. 15 shows the generally ellipsoidal (elongated) top plan view outline shape of the FIG. 4 lens.

I claim:

1. An illumination system with a prescribed output pattern comprising a light source and an optical lens redirecting the light of said source into an output beam, said lens with multiple surfaces at least one of which has a shape that is not a surface of revolution, said shape generated by the following method:

a) on a Gaussian sphere of directions of said output beam exiting a surface of said lens in accordance with said prescribed output pattern, establish a first grid of equal-flux zones of solid angle, b) on a portion of the Gaussian sphere of directions of the light emitted from said source into an interior of said lens, establish a second grid with the same number of equal-flux zones of solid angles as said first grid, with a coordinate-system topology congruent with that of said first grid, such that the zones of said second grid are in one-to-one correspondence with the zones of said first grid, with the flux of each zone in proportion to its corresponding zone of said first grid, according to a local transmittance of said lens, with either of both of said grids being rotationally non-symmetric, c) by said correspondence define a flux-redistributing directional mapping function from said first Gaussian sphere to said second Gaussian sphere, whereby most light rays from said source can be assigned a direction in said output beam, according to the zone of said second grid into which each of said rays fall, so that said redirected ray falls in the corresponding zone of said first grid, d) establish one or more lens surfaces to redirect the source rays to the output rays, using the vector laws of refraction or reflection to derive a distribution of normal vectors for each surface, and e) from said distributions of normal vectors, successively generate each lens surface, beginning with that nearest said source and progressing outwards.

2. The system of claim 1 whereby the said lens surfaces are generated from said distributions of normal vectors by the following method:

f) from an initial starting point, calculate surface coordinates of each surface of said lens by contact-integrating said distribution of surface normal vectors, along an initial strip that follows one principal curvature of the surface and then, by successive contact-integrations, orthogonally outwards from said initial strip, of said grid of surface normals, generate adjacent characteristic strips outward to a boundary of said second grid, g) to ensure that the surface of said lens possesses surface normals necessary for it to transform the light from said source into an output beam substantially fulfilling said prescription, perform successive integrations of adjacent characteristic strips so as to fulfill the integrability condition dictating equality of crossed second derivatives of the surface of said lens, h) and determine an overall size of said lens relative to a size of said light source by selecting a distance of said initial point from said source to keep the angular blurring by a finite size of said source of said output beam below a level defined by an angular resolution of said prescription.

3. The system of claim 1 wherein said source is provided to be in optical contact with said lens, and said redirection is from within a lens material outwards into the environment, by refraction, with said distribution of surface normals determined by the vector form of Snell's law of refraction.

4. The system of claim 1 wherein said lens is provided to have an entry surface admitting light from said source into its interior and an exit surface for light leaving said interior.

5. The system of claim 4 wherein said entry surface performs negligible redirection, and substantially an entirety of said redirection is performed by an external surface.

6. The system of claim 4 wherein said entry surface redirects said source light, so that a new system of interior rays is used to generate the surface normal distributions of both of said surfaces, with a total redirection of said source light allocated between said entry and exit surface normals.

7. The system of claim 4 wherein said source is provided to be a high-temperature lamp.

8. The system of claim 7 wherein said source is an incandescent lamp, said prescription is the Coast Guard 360-degree masthead navigation light, and said lens has a horizontal cross section with a teardrop shape that eliminates shadowing of a filament of said lamp by support posts of said filament.

9. The system of claim 7 wherein said source is an incandescent lamp with a substantially cylindrical filament in a vertical orientation, said prescription is the Coast Guard 225-degree forward navigation light.

10. The combination of the system of claim 7 wherein said source is an incandescent lamp with a substantially cylindrical filament in a vertical orientation, said prescription is the Coast Guard 135-degree stern navigation light, and said lens utilizes a reflective surface to redirect a portion of the output of said lamp into said prescribed output.

11. The system of claim 1 including providing a reflecting surface, and wherein large redirection angles are implemented with said reflecting surface.

12. The system of claim 11 wherein said reflecting surface utilizes total internal reflection.

13. The system of claim 11 wherein said reflecting surface utilizes a thin-film metal coating.

14. The system of the combination of claims 11 wherein said reflecting surface is generated by the method that includes:

a) partitioning said first grid into an inner refraction-only portion and an outer reflection-assisted zone, according to the maximum practical redirection angle of the refractive index of the material of said lens, and effect a corresponding partition of said third grid of light interior to said lens, b) surrounding an exterior surface of the central refraction-only portion of said lens, establish an outer conicoid portion of the exterior surface of said lens, said conicoid tilted so as to minimize the impingement upon it of rays coming directly from said source, c) via backwards ray tracing of refraction through said tilted surface, transform said outer portion of said first grid into a grid upon the Gaussian sphere of directions of light interior to said lens, d) establish a one-to-one correspondence between said partial grid of backwards-ray-traced light interior to said lens and said outer portion of said third grid, e) by the vector form of the law of reflection, express said correspondence by establishing on said outer portion of said third grid an overlaying distribution of surface normal vectors, f) utilizing the outer perimeter of said tilted exterior surface as an initial strip, mathematically generate the surface coordinates of said reflective surface by said method of contact integration of orthogonal characteristic strips, g) and extending said conical surface sufficiently far so that said characteristic strips will not impinge upon said light source or said inner lens surface.

15. The method of claim 14 wherein said lens is characterized as having surfaces the selected from the group consisting of a) TIR surface,
b) mirror surface.

16. The method of claim 14 wherein said source is selected from the group consisting of a) an incandescent light,
b) an LED,
c) an array of LEDs,
d) together with a light diffuser through which source light passes before entering the lens,
e) an LED together with a light diffuser through which source light passes before entering the lens
f) an array of LEDs together with a light diffuser through which source light passes before entering the lens.

17. The method of claim 14 wherein said output prescription is the U.S. Department of Transportation photometric standard for automotive stop lamps, center high mounted stop lamps, directional markers, or side markers, and said source is one or more light-emitting diodes.

18. The method of claim 14 wherein said output prescription is an Institute of Transportation Engineers standard for automotive or railroad colored traffic signals, and said light source is a red, yellow, green, or blue light-emitting diode.

19. The method of claim 14 wherein said output prescription corresponds to an illuminance pattern on a nearby non-spherical surface.

20. The system of claim 1 wherein said output prescription is one of the Coast Guard standards for navigation lights.

21. The system of claim 1 wherein said output prescription is a Society of Automotive Engineers' standard for vehicular lights.

22. The system of claim 1 wherein said source is one or more light emitting diodes.

23. The system of claim 22 including providing said lens to have a bulbous shape with quadrilateral symmetry comprised by a horizontal major axis and a vertical minor axis.

24. The system of claim 22 wherein said light-emitting diodes are provided to have several wavelengths so as to metamerically combine their light for white color.

25. The system of claim 22 wherein said multiple light-emitting diodes are provided to have several wavelengths and have individual intensity controls capable of video signal rendition.

26. The system of claim 25 wherein multiple said lenses lie in an array comprising a video screen for display of television or computer imagery, so that each of said lenses comprises a pixel of said display.

27. The system of claim 26 wherein said multiple lenses have output prescriptions aimed at a specific audience location.

28. The system of claim 25 wherein said array of lenses is mounted on a surface of low reflectance.

29. The system of claim 1 wherein said output prescription is provided in terms of an illuminance pattern on a nearby non-spherical surface.

30. For use in providing an illumination system with a prescribed output pattern comprising a light source and an optical lens redirecting the light of said source into an output beam, said lens with a shape that is not a surface of revolution, said shape generated by the method that includes:

a) on a Gaussian sphere of directions of said output beam exiting a surface of said lens, in accordance with said prescribed output pattern, establish a first grid of equal-flux zones of solid angle, b) on a portion of the Gaussian sphere of directions of the light emitted from said source into an interior of said lens, establish a grid with the same number of equal-flux zones of solid angle as said first grid, and with a coordinate system topology congruent with that of said first grid, such that the zones of said second grid are in one-to-one topological correspondence with the zones of said first grid, with the flux of each zone of said second grid in proportion to the flux of its corresponding zone of said first grid, according to a local transmittance of said lens, with either or both of said grids being rotationally non-symmetric, c) by use of said correspondence, define a flux-redistributing directional mapping function from said first Gaussian sphere to said second Gaussian sphere, whereby any light ray from said source is assigned a direction in said output beam, according to the zone of said second grid into which said ray falls, and so that the redirected ray also falls in the corresponding zone of said first grid, d) by the vector form of Snell's law of refraction, express said correspondence by establishing on said second grid an overlaying distribution of surface normal vectors, e) from an initial starting point, mathematically generate the surface coordinates of said lens by contact-integrating said distribution of said surface normal vectors, along an initial strip that follows a principal curvature of the surface, and then, by successive contact-integrations, orthogonally outwards from said initial strip, of said surface normals, generate adjacent characteristic geodesic strips that follow the other principal curvature of said lens surface, outward to a boundary of said second grid, f) perform successive integrations of adjacent characteristic geodesic strips, so as to fulfill an integrability condition dictating equality of crossed second derivatives of the surface of said lens, thereby to ensure that the surface of said lens possesses the surface normals necessary for it to transform the light from said source into an output beam substantially fulfilling said prescription, g) and determine an overall size of said lens relative to a size of said light source by selecting a distance of said initial point from said source so as to keep the blurring of said output beam below a level defined by an angular resolution of said prescription.

31. The method of claim 30 wherein said lens is characterized as employing two refractive surfaces.

32. The method of claim 31 wherein said two refractive surfaces are generated by the method that includes:

a) on the Gaussian sphere of directions of said output beam exiting said outer refractive surface of said lens, in accordance with said prescribed output pattern, establish a first grid of equal-flux zones of solid angle, b) on a portion of the Gaussian sphere of directions of light exiting said source into air, establish a grid with the same number of equal-flux zones of solid angle as said first grid, and with a coordinate-system topology congruent with that of said first grid, such that the zones of said second grid are in one-to-one topological correspondence with the zones of said first grid, with the zones of said first grid, with the flux of each zone of said second grid in proportion to the flux of its corresponding zone of said first grid, according to the local transmittance of said lens, c) on the Gaussian sphere of directions of light refracted into said interior of said lens by said inner surface, establish a third grid with the same number of equal-flux zones of solid angle as said second grid, and with a coordinate system topology congruent with that of said second grid, such the zones of said third grid are in one-to-one topological correspondence with the zones of second grid, with the flux of each zone of said third grid in proportion to the flux of its corresponding zone of said second grid, according to the local transmittance of said inner surface of said lens, with any one, any two, or all three of said grids being rotationally non-symmetric, d) by the use of said correspondences, define flux-redistributing directional mapping functions from said first Gaussian sphere to said third Gaussian sphere, and from said second Gaussian sphere to said third Gaussian sphere, whereby most light rays from said source is assigned a direction in said output beam, according the zone of said second grid into which each said ray falls, so that a refracted interior ray also falls in the corresponding zone of said third grid, and so that a refracted output ray also falls in the corresponding zone of said first grid, e) by the vector form of Snell's law of refraction, express said correspondences by establishing on said second grid an overlaying distribution of surface normal vectors for said interior lens surface and by establishing on said third grid an overlaying distribution of surface normal vectors for said exterior lens surface, f) from an initial starting point, mathematically generate the surface coordinates of said interior surface of said lens by contact-integrating said distribution of said surface normal vectors on said second grid, along an initial strip that follows a principal curvature of said interior surface, and then, by successive contact-integrations, orthogonally outwards from said initial strip, of said surface normals, generate adjacent characteristic geodesic strips that follow the other principal curvature of said interior lens surface, outward to the boundary of said second grid, g) at a suitable distance along the interior ray refracted from said initial starting point of said interior surface of said lens, establish an initial starting point for said exterior surface of said lens, and by said method of contact integration generate said exterior surface, said suitable distance determined by keeping said exterior surface from intersecting said interior surface at any point inside the boundary of said interior surface, h) and determine the overall size of said lens relative to the size of said light source by selecting the distance of said initial point of said interior surface of said lens from said source so as to keep the blurring of said output beam below a level defined by the angular resolution of said prescription.

33. The method of claim 30 wherein said source is in optical contact with said lens.

34. The method of claim 30 wherein said lens has an entry surface admitting source light to its interior.

35. The method of claim 30 wherein said output prescription is the Coast Guard standard for navigation lights and said source is one or more light-emitting diodes, said lens having a bulbous shape, with quadrilateral symmetry comprised by a horizontal major axis and a vertical minor axis.

36. In combination, an optical lens in the form of an asymmetric dome-shaped body located above an integral support base, and LED light source means associated with said base, said base upwardly divergent relatively away from a recess, and wherein said light source means is embedded in a transparent mass of material received in the recess, said base and dome-shaped body being laterally elongated, said dome-shaped body overhanging said base, and said body being generally ellipsoidal in lateral horizontal planes above said base.

37. The method of claim 30 wherein said lens body is assembled to have an overall length $L_1$ and overall width $W_2$, above said base, where $L_1 > W_2$.

38. The method of claim 30 including locating the LED in a base, so that there is no air gap between the LED means and the lens body, which is light transmitting.

39. The method of claim 32 whereby said third grid is established so that said interior and exterior surfaces have substantially equal amounts of refraction.

40. A luminaire comprising:

a) a lens body having a forwardly dome-shaped inner portion, and an outer portion extending abut and spaced from said inner portion, said portions being light-transmitting, and integral, b) the inner portions extending non-circularly about a forwardly and upward axis, c) their being a reflector on said outer portion, whereby a light source in rearward alignment with said inner portion provides certain light rays that travel forwardly and are refracted by said dome-shaped inner portion to travel forwardly from said inner portion, and other light rays that travel in said outer portion and are reflected by said reflector to travel forwardly in said outer portion, and forwardly from said outer portion, d) said dome-shaped inner portion located above an integral base, said light source associated with said base, said base upwardly divergent relatively away from a recess, and wherein said light source means is embedded in a transparent mass of material received in the recess, said base and dome-shaped body being laterally elongated, said dome-shaped body overhanging said base, and said body being generally ellipsoidal in lateral horizontal planes above said base.

* * * * *